UNITED STATES PATENT OFFICE.

GEORGE A. FREAR, OF CHICAGO, ILLINOIS, ASSIGNOR TO CHARLES HOLLAND, GEORGE A. FREAR, AND JOHN M. WILSON.

IMPROVEMENT IN THE MANUFACTURE OF ARTIFICIAL STONE, STUCCO, &c.

Specification forming part of Letters Patent No. 73,965, dated February 4, 1868; reissue No. 4,456, dated July 4, 1871.

*To all whom it may concern:*

Be it known that I, GEORGE A. FREAR, of Chicago, in the county of Cook and State of Illinois, have invented a new and useful Improvement in the Production of Artificial Stones and Marbles, and of Stucco, Cements, and Mineral Paints, of which the following is a specification:

The nature of my invention consists in the use of an aqueous solution of gum shellac, or its equivalent, in combining or cementing together particles of silex, alumina, calcium, or other mineral substances, to produce, not only artificial marbles and stones, but also stuccos, cements or paints, for useful and ornamental purposes; and in the compression of a composition of lime or cement and sand, or of other admixtures of earthy or mineral substances, moistened or dampened with an aqueous solution of gum shellac, into molds of any desired configuration, by the application of repeated blows with a suitable tamping-tool to successive layers of the composition placed therein while still in a plastic condition, for the purpose of producing thereby a hard, tenacious, and durable artificial stone.

My shellac solution is best obtained by boiling the gum shellac of commerce in water previously made alkaline by the addition of any suitable alkaline salt in proper proportion. The proportions of shellac, alkali, and water may and necessarily will vary with the strength and quality of the solution required in producing various descriptions of stones, cements, &c.

In the manufacture of artificial stone for building purposes I use a solution obtained by first dissolving from two to four ounces of saleratus, potash, soda, or other equivalent alkali, in about one gallon of pure boiling water, and then adding thereto one pound of gum shellac, and boiling the mixture until the gum is entirely dissolved.

A firm and durable stone, impervious to moisture, is produced by dampening a mixture of about one part of lime or cement and four parts of sand or other silicious material, with or without gravel or other ingredients, with my aqueous solution of shellac, and then firmly compressing the composition into molds of any desired form, either by the use of suitable machinery or by hand.

I prefer to obtain the compression of the material by percussion rather than by simple pressure. To this end a certain quantity of the composition is placed, in a damp plastic state, in the mold, and spread to a proper thickness—say about four inches—but which is greater or lesser according to the kind of work, and, by the application of repeated and systematic blows with a pounder or flat-ended tool, heavy and hard, the composition is compressed into a dense firm mass. When one stratum has thus been perfectly packed and tamped in the mold a new portion of material is introduced and packed in the same manner, so that by continuing to add new portions of the composition and agglomerating said portions with the former stratums by percussion, as described, a perfectly hard and compact mass of the desired thickness and form is obtained. The blocks or other articles thus produced will rapidly harden when removed from the molds, and in a few days are ready for building purposes.

To produce a more perfect finish I contemplate washing the surface or face of the artificial stone thus manufactured, five or six days after molding the same, with a weak solution of shellac dissolved in alcohol, ether, or spirits of turpentine—say, about one pound of shellac in one gallon of the spirits.

Instead of using a mixture of lime or cement and sand to produce an artificial stone, I contemplate moistening simple sand, clay, lime, chalk, or other earthy or mineral substance, as well as any combinations thereof, with my aqueous shellac solution, and then molding the same, by percussion, into suitable blocks or other devices, so that endless variety may be obtained therein at pleasure.

To produce a mastic or stucco I add so much of my shellac solution to lime, sand, clay, or any earthy or silicious material, or to mixtures thereof, as that the material or mixture shall be reduced by the solution to a pasty consistency, which can be readily worked and applied with a trowel. If then applied to any suitable surface it will firmly adhere thereto, and, upon hardening, produce a firm water-proof surface, which may be made to resemble stone so closely as not to be readily distinguishable therefrom.

Through a proper choice of the sand or other substances forming the basis of my improved artificial stones, &c., or by the use of coloring matter in connection therewith, nearly all descriptions of natural stone may be imitated, and any colors or shades of material obtained at pleasure.

In applying my improved stucco to buildings, whether of brick or stone, I first wash the surface with my aqueous shellac solution preparatory to laying on the composition hereinbefore described.

I claim as my invention—

1. The use of an aqueous solution of shellac in the production of artificial stones, stuccoes, &c., for useful and ornamental purposes.

2. In the manufacture of artificial stone with the within-described compositions, bringing the molecules of the mass in close proximity one to the other by means and with the use of a suitable tamping-tool applied systematically to successive layers of the composition, substantially as herein set forth.

GEO. A. FREAR.

Witnesses:
A. E. FREAR,
DAVID A. BURR.